US009127829B2

(12) United States Patent
Scott et al.

(10) Patent No.: US 9,127,829 B2
(45) Date of Patent: Sep. 8, 2015

(54) AC LED ARRAY MODULE FOR STREET LIGHT APPLICATIONS

(71) Applicant: BRIDGELUX, INC., Livermore, CA (US)

(72) Inventors: Keith Scott, Livermore, CA (US); Todd Farmer, Livermore, CA (US)

(73) Assignee: Bridgelux, Inc., Livermore, CA (US)

( * ) Notice: Subject to any disclaimer, the term of this patent is extended or adjusted under 35 U.S.C. 154(b) by 74 days.

(21) Appl. No.: 13/873,758

(22) Filed: Apr. 30, 2013

(65) Prior Publication Data

US 2013/0242535 A1    Sep. 19, 2013

Related U.S. Application Data

(63) Continuation of application No. PCT/US2011/060072, filed on Nov. 9, 2011, which is a continuation of application No. 13/290,970, filed on Nov. 7, 2011, now abandoned.

(60) Provisional application No. 61/412,740, filed on Nov. 11, 2010.

(51) Int. Cl.
| *F21V 17/12* | (2006.01) |
| *F21V 21/00* | (2006.01) |
| *F21S 8/08* | (2006.01) |
| *F21V 9/16* | (2006.01) |
| *F21W 131/103* | (2006.01) |
| *F21Y 105/00* | (2006.01) |
| *F21Y 101/02* | (2006.01) |

(52) U.S. Cl.
CPC ............ *F21V 21/00* (2013.01); *F21S 8/086* (2013.01); *F21V 9/16* (2013.01); *F21W 2131/103* (2013.01); *F21Y 2101/02* (2013.01); *F21Y 2105/001* (2013.01); *Y02B 20/72* (2013.01)

(58) Field of Classification Search
CPC ............... F21S 8/085–8/088; F21V 17/12; F21V 19/0065; F21V 19/006; F21V 29/2243; F21V 29/2206
USPC ............... 362/373, 249.02, 249.01, 431, 294
See application file for complete search history.

(56) References Cited

U.S. PATENT DOCUMENTS

| 2005/0017252 A1 | 1/2005 | Streubel et al. |
| 2007/0081340 A1 | 4/2007 | Chung et al. |

(Continued)

FOREIGN PATENT DOCUMENTS

| TW | M346723 U | 12/2008 |
| TW | 200938758 A | 9/2009 |
| TW | M390413 U | 10/2010 |

OTHER PUBLICATIONS

International Preliminary Report on Patentability mailed May 23, 2013 for International Application No. PCT/US2011060072.

(Continued)

*Primary Examiner* — Julie Bannan
(74) *Attorney, Agent, or Firm* — Arent Fox LLP

(57) ABSTRACT

A street light includes a pole, arm and a head attached to the pole, wherein the head comprises a light source having a plurality of solid state light emitting devices and an optical element configured to produce a light distribution pattern from light emitted from the solid state light emitting devices, wherein the light source is configured to be powered directly from an AC source.

20 Claims, 5 Drawing Sheets

(56) References Cited

U.S. PATENT DOCUMENTS

| | | |
|---|---|---|
| 2008/0252229 A1 | 10/2008 | Wu |
| 2009/0237930 A1* | 9/2009 | Li .................................. 362/235 |
| 2010/0046221 A1* | 2/2010 | Posselt et al. ............ 362/249.02 |
| 2010/0060157 A1* | 3/2010 | Shi ................................ 313/512 |
| 2010/0124059 A1 | 5/2010 | Duffy et al. |
| 2010/0134046 A1* | 6/2010 | Holder et al. ................. 315/297 |
| 2010/0226138 A1* | 9/2010 | Lin et al. ....................... 362/373 |
| 2012/0099321 A1 | 4/2012 | Scott |
| 2012/0120655 A1 | 5/2012 | Scott |

OTHER PUBLICATIONS

Notification Concerning Transmittal of Copy of International Preliminary Report on Patentability mailed May 23, 2013 for International Application No. PCT/US2011060072.

International Search Report dated Mar. 13, 2012 regarding International Application No. PCT/US2011/060072.

First Office Action dated Nov. 7, 2013 regarding Taiwan Patent Application No. TW100141191.

\* cited by examiner

AC LED ARRAY MODULE FOR STREET LIGHT APPLICATIONS

CROSS-REFERENCE TO RELATED APPLICATION

This application claims the benefit of International Application No. PCT/US11/60072 filed on Nov. 9, 2011, entitled "AC LED ARRAY MODULE FOR STREET LIGHT APPLICATIONS," which claims the benefit of U.S. patent application Ser. No. 13/290,970, entitled "AC LED ARRAY MODULE FOR STREET LIGHT APPLICATIONS," filed on Nov. 7, 2011, which claims the benefit of U.S. Provisional Patent Application 61/412,740, entitled "AC LED ARRAY MODULE FOR STREET LIGHT APPLICATIONS," filed on Nov. 11, 2010, and assigned to the assignee hereof and the contents of which are expressly incorporated by reference herein in their entirety.

BACKGROUND

1. Field

The present disclosure relates to illumination devices. More particularly, the disclosure relates to powering solid state light emitting devices with an alternating current (AC) voltage source.

2. Background

Solid state light emitting devices, such as light emitting diodes (LEDs), are attractive candidates for replacing conventional light sources such as incandescent, halogen and fluorescent lamps. LEDs have substantially higher light conversion efficiencies than incandescent and halogen lamps and longer lifetimes than all three of these types of conventional light sources. In addition, some types of LEDs now have higher conversion efficiencies than fluorescent light sources and still higher conversion efficiencies have been demonstrated in the laboratory. Finally, LEDs contain no mercury or other potentially dangerous materials, therefore, providing various safety and environmental benefits.

More recently, solid state devices have been used to replace high-intensity discharge (HID) lamps to provide high levels of light over large areas when energy efficiency and/or light intensity are required. These areas include roadways, parking lots, pathways, large public areas, and other outdoor applications. To increase the intensity of light in these applications, often more than one solid state light emitting device is arranged in a package. An example of a solid state light emitting device is a light emitting semiconductor chip comprising a p-n junction. An example of a package is a collection of light emitting devices arranged on a substrate and encapsulated in a phosphor to produce broad spectrum white light. This package is sometimes referred to as an "LED array." A heat sink is often attached to the LED array to dissipate heat generated by the light emitting devices.

LEDs are being used to replace high intensity discharge (HID) lamps in legacy street lights. The conversion to LED-based street lights generally involves replacing the existing head portion attached to the top of a pole with a new LED-based head. Because LEDs are diodes, when driven by AC power, light is emitted only during the forward bias phase of the voltage. In addition, because the duty cycle operation of the LED is equal or less than 50%, flicker can occur, and can be an unpleasant effect, and may pose an adverse safety situation for street traffic. Consequently, it is desirable to have an LED street light illumination system that overcomes duty cycle and flicker.

SUMMARY

A modular LED array is disclosed to address the drawbacks associated with LED street lights. The modular LED array comprises a number of LEDs arranged on a substrate to emit light through an optical element, thus eliminating the need for an elongated MCPCB to carry multiple emitting devices. Preferably, the LEDs are electrically coupled together through electrodes provided on a light emitting ("top") side of the LEDs. With the electrodes positioned on the top side of the LEDs, the substrate can, but does not have to be electrically insulating, to provide better thermal conductivity by increased possibilities of material selection. The modular LED array may further comprise a heat sink attached to the thermally conductive substrate to dissipate the heat generated by the LEDs. The modular LED array may be attached to a mounting carriage via the substrate. The mounting carriage may be attached to the head.

The use of a single optical element to focus the light from the LEDs onto the roadway is a more economical approach compared to conventional emitting device configurations with multiple optical elements. In addition, the reliability of the street light may be improved with the LED array module because it requires less circuitry than multiple emitting devices.

The modular design of the LED array makes the retrofitting of legacy street lights much easier. Conventionally, the entire head of the street light is replaced to convert the street light to an LED-based street light. In an embodiment of the disclosure, the LED array module may be installed into an existing street light head. An installer simply removes the HID lamp, the electrical socket, and the reflector from the existing head. The mounting carriage, which carries the LED array module, may then be attached to the head using the screw holes that were previously used to hold a reflector. The wires that were previously connected to a ballast may be attached to a driver mounted in the head. The driver is used to provide AC power to the LED array module, and may be positioned on the substrate or the mounting carriage. Alternatively, the driver may be mounted in the pole of the street light and wires from the driver connected directly to the LED array module.

In an aspect of the disclosure, a street light includes a pole, and a head attached to the pole. The head includes a light source having a plurality of solid state light emitting devices and an optical element configured to produce a light distribution pattern from light emitted from the solid state light emitting devices, wherein the light source is configured to be powered directly from an AC source.

The light source includes at least a first one or more solid state light emitting devices, and at least a second one or more solid state light emitting devices, wherein the emitting devices are light emitting diodes (LEDs), and therefore only emit light when subjected to a forward bias voltage. The first one or more solid state light emitting devices are electrically connected in series, with the polarity of the diodes all in a first direction. The second one or more solid state light emitting devices are electrically connected in series, with the polarity of the diodes all in a second direction that is the reverse of the polarity of the first one or more solid state light emitting devices. The first and second one or more solid state light emitting devices may be electrically connected in parallel. The first one or more solid state light emitting devices may be forward bias during a first portion of an AC voltage cycle, and the second one or more solid state light emitting devices may be forward biased during a second portion or the AC cycle voltage. A one or more capacitors or other power storing electronics in parallel with the first and second one or more solid state light emitting devices sustains a forward bias discharge current through the first and second one or more solid state light emitting devices even as the AC forward voltage reduces, thus reducing flicker.

In an aspect of the disclosure, a street light includes a pole and a head attached to the pole, the head having one or more solid state light emitting devices and a mounting carriage supporting the one or more solid state light emitting devices, wherein the solid state light emitting devices is configured to be powered directly from an AC source.

DETAILED DESCRIPTION

Figure 1:
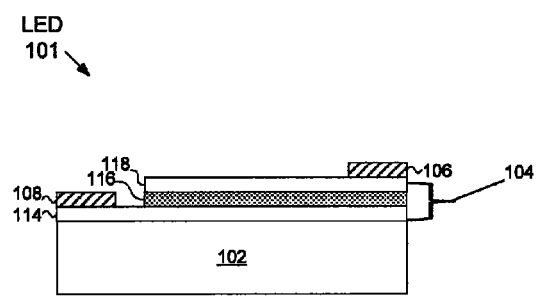
FIG. 1 is a conceptual cross-sectional side view illustrating an example of an LED.

The present invention is described more fully hereinafter with reference to the accompanying drawings, in which various aspects of the present invention are shown. For purposes of this disclosure, "street light" refers to any lighting system that provides any illumination to a street, road, walkway, tunnel, park, outdoor facility, parking lot, or the like. A "pole" refers any structure for supporting a lighting system, including, for example, a lamp post, hi-bay support, wall mounting, suspended hanging fixture, support frame, ceiling mount, or the like. A "Head" refers to the entity providing mechanical and environmental enclosure to the light source. An "Arm" refers to the horizontal vertical extension from the pole to the head. A "thermal management system" may comprise at least one of a heat sink, heat spreader, heat fin, heat pipe, thermal interface material, active air movement devices, or the like. This invention, however, may be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element such as a structure is referred to as being coupled to another element, it can be directly connected to the other element or intervening elements may also be present. For example, one element may be electrically coupled to another by direct conductive connection, or there may be an intervening electrically conductive connector, a capacitive, inductive or other form of connection which provides for transmission of electrical current, power, signal or equivalents. Similarly, two elements may be mechanically coupled by being either directly physically connected, or intervening connecting elements may be present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The detailed description set forth below in connection with the appended drawings is intended as a description of various aspects of the present invention and is not intended to represent all aspects in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Various aspects of a light source will now be presented. However, as those skilled in the art will readily appreciate, these aspects may be extended to other apparatus without departing from the spirit and scope of the invention. The light source may include a series of solid state light emitting devices mounted on a universal mounting carriage. The universal mounting carriage is configured to replace one or more parts of the illumination system in any of a plurality of available housing heads for lighting. The plurality of housing heads may differ in at least one dimension, and the illumination systems may also vary in illumination pattern and intensity requirements.

Disclosed is an apparatus and method for retrofitting conventional lighting systems, such as, for example, street lights, with solid state light emitting devices assembled on a universal mounting carriage that enables installation where previously non-solid state light emitting devices were installed. The solid state light emitting devices (and/or arrays of them) require a mounting device to enable installing them, for example, in conventional street lamp domes, such as a cobra head.

An example of a solid state light emitting device for used in solid state light emitting devices is the light emitting diode (LED). The LED is well known in the art, and therefore, will only briefly be discussed to provide a complete description of the invention. An LED is a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, and is referred to as n-type or a p-type semiconductor region, respectively. In LED applications, the semiconductor includes an n-type semiconductor region and a p-type semiconductor region. A reverse electric field is created at the junction between the two regions, which cause the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light.

LEDs are available in a range of colors of relatively narrow bandwidth. However, in applications where it is desirable to simulate illumination spectral properties representative of "white light" produced by incandescent, fluorescent, halogen or natural sunlight, one solution is to include one or more phosphors in a carrier encapsulating, or as a layer above, a blue LED. The phosphors absorb a portion of the short wavelength blue light and emit longer wavelengths of light by a process of Stokes shift emission. By controlling the type and amount of phosphor a balanced mix of light emitted by the LED directly and the phosphor is perceive by the human eye as "white light."

Referring to FIG. 1, the LED 101 includes a substrate 102, an epitaxial-layer structure 104 on the substrate 102, and a pair of electrodes 106 and 108 on the epitaxial-layer structure 104. The epitaxial-layer structure 104 comprises an active region 116 sandwiched between two oppositely doped epitaxial regions. In this example, an n-type semiconductor region 114 is formed on the substrate 102 and a p-type semiconductor region 118 is formed on the active region 116, however, the regions may be reversed. That is, the p-type semiconductor region 118 may be formed on the substrate 102 and the n-type semiconductor region 114 may formed on the active region 116. As those skilled in the art will readily appreciate, the various concepts described throughout this disclosure may be extended to any suitable epitaxial-layer structure. Additional layers (not shown) may also be included in the epitaxial-layer structure 104, including but not limited to buffer, nucleation, contact and current spreading layers as well as light extraction layers.

The electrodes 106 and 108 may be formed on the surface of the epitaxial-layer structure 104. The p-type semiconductor region 118 is exposed at the top surface, and therefore, the p-type electrode 106 may be readily formed thereon. However, the n-type semiconductor region 114 is buried beneath the p-type semiconductor region 118 and the active region 116. Accordingly, to form the n-type electrode 108 on the n-type semiconductor region 114, a portion of the active region 116 and the p-type semiconductor region 118 is removed to expose the n-type semiconductor region 114 therebeneath. After this portion of the epitaxial-layer structure 104 is removed, the n-type electrode 108 may be formed.

Figure 2:
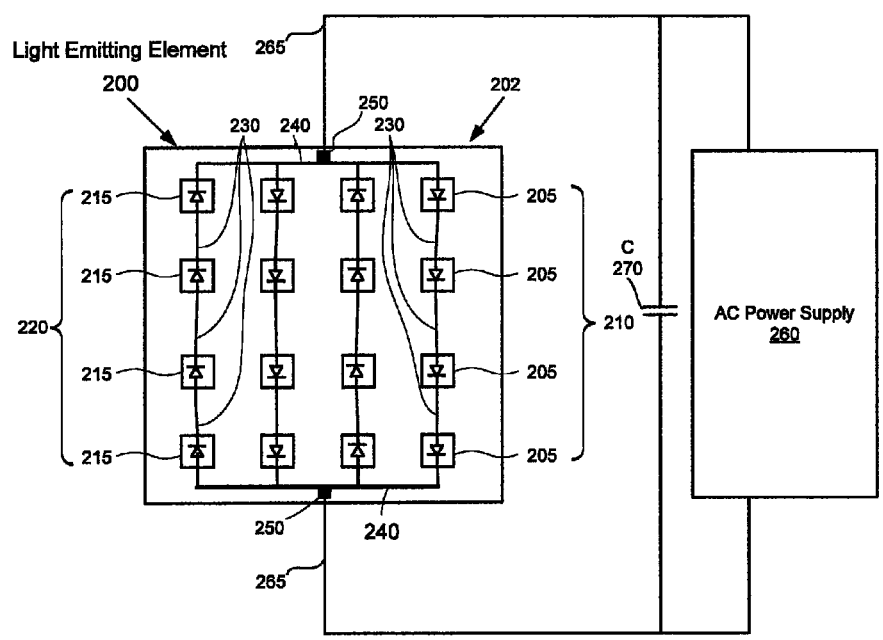
FIG. 2 is a conceptual cross-sectional view illustrating an example of an LED coated with a phosphor material.

As discussed above, one or more light emitting devices may be used to construct an LED array. One example of an LED array will now be presented with reference to FIG. 2. FIG. 2 is a conceptual top view illustrating an example of an LED array. In this example, an LED array 200 is configured with multiple LEDs 205 and 215 arranged on a substrate 202. The substrate 202 may be made from any suitable material that provides mechanical support to the LEDs 205, 215. Preferably, the material is thermally conductive to dissipate heat away from the LEDs 205, 215. The substrate 202 may include a dielectric layer (not shown) to provide electrical insulation between the LEDs 205 and 215. The LEDs 205, 215 may be electrically coupled in parallel and/or series by a conductive circuit layer, wire bonding, or a combination of these or other methods on the dielectric layer.

In the example shown in FIG. 2, LEDs 205 are arranged in a serial array 210 with diode polarity all in a first direction. Also, LEDs 215 are arranged in a serial array 220, with diode polarity all in a second direction that is the reverse of the serial array 210. A plurality of serial arrays 210 and 220 may be arranged on the substrate 202 to provide a selected total number of LEDs 205, 215. Electrical traces 230 connect all LEDs in series in serial array 210 or in serial array 220, respectively, and electrical traces 240 connect serial array 210 and 220 in parallel. Electrodes 250 provide connection from an AC power supply 260 via electrical lines 265.

The AC power supply 260 may obtain AC power as provided to a conventional street light. The AC power supply 260 may include an AC voltage transformer (not shown) in order to convert incoming AC voltage (typically 120 V or 240 V) to a voltage appropriate to the forward bias voltage drop across a selected number of LEDs 205, 215 in serial connections 210 and 220. For example, a typical LED may have a maximum forward bias voltage of approximately 3 V. Therefore, a serial connection 210 in parallel with a serial connection 220, each comprising 4 LEDs, operates on 12 V AC, which is provided by the AC power supply.

With the serial arrays 210 and 220 having opposite polarity for forward bias, it is evident that one serial array 210 will emit light when the AC voltage is in a first phase, or portion, of the AC waveform so as to forward bias the LEDs 205, and a second serial array 220 will emit light when the AC voltage is in a second phase, or portion, of opposite polarity of the AC waveform so as to forward bias the LEDs 215. Thus, in the example described, at any given time, either the first serial array 210 or the second serial array 220 is forward biased to emit light from the LEDs 205 or 215, respectively.

It may occur, due to the frequency of the AC voltage, that flicker in the emitted light is perceptible by the human eye, which is often unpleasant or distracting. To reduce the flicker of the light source including the light emitting device 200 when driven by the AC power supply 260, a one or more capacitors or other power storing devices or electronic circuits 270 may be placed in parallel with the AC power supply 260. Charge stored in the capacitor C 270 with a first polarity during the first portion of the AC cycle will drain through the corresponding forward biased first or second serial array 210 or 220. Due to a time constant t=R×C, where R is the net resistance of the first or second serial array 210 or 220, a forward current will persist in each array due to a continuing, decaying forward current. Thus, any null in light emitted from the light emitting element 200 is reduced or eliminated, depending on the value of capacitance C 270 selected and the AC voltage frequency.

The LED array may be configured to produce white light. White light may enable the LED array to act as a direct replacement for conventional light sources used today in incandescent, halogen, fluorescent, HID, and other suitable lamps. There are at least two common ways of producing white light. One way is to use individual LEDs that emit wavelengths (such as red, green, blue, amber, or other colors) and then mix all the colors to produce white light. The other way is to use a phosphor material or materials to convert monochromatic light emitted from a blue or ultra-violet (UV) LED to broad-spectrum white light. The present invention, however, may be practiced with other LED and phosphor combinations to produce different color lights.

Figure 3A:
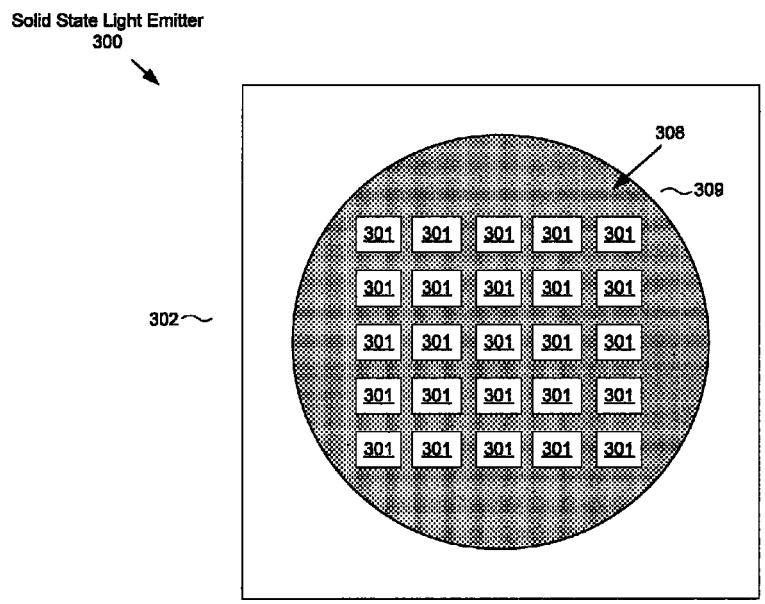
FIG. 3A is a conceptual top view illustrating an example of a white light source.
Figure 3B:
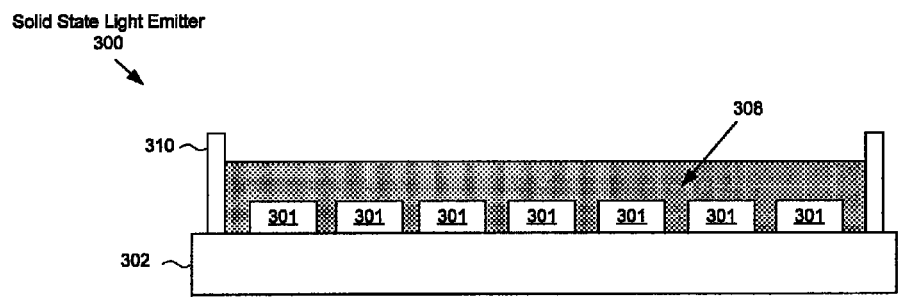
FIG. 3B is a conceptual cross-sectional side view of the white light source in FIG. 3A.

An example of a LED array will now be presented with reference to FIG. 3. FIG. 3A is a conceptual top view illustrating an example of a white light LED array, now referred to as a solid state light emitting device and FIG. 3B is a conceptual cross-sectional side view of the solid state light emitting device in FIG. 3A. The solid state light emitting device 300 is shown with a substrate 302 which may be used to support multiple LEDs 301. The substrate 302 may be configured in a manner similar to that described in connection with FIG. 2 or in some other suitable way. In this example, the substrate 302 includes a plurality of slots 310 along the periphery. A phosphor material 308 may be deposited within a cavity defined by an annular, or other shaped, or other boundary 309 that extends circumferentially, or in any shape, around the upper surface of the substrate 302. The annular boundary 309 may be formed with a suitable mold, or alternatively, formed separately from the substrate 302 and attached to the substrate 302 using an adhesive or other suitable means. The phosphor material 308 may include, by way of example, phosphor particles suspended in an epoxy, silicone, or other carrier or may be constructed from a soluble phosphor that is dissolved in the carrier.

In an alternative configuration of a white light emitting element, each LED 301 may have its own phosphor layer. As those skilled in the art will readily appreciate, various configurations of LEDs and other light emitting devices may be used to create a white light emitting element. Moreover, as noted earlier, the present invention is not limited to solid state lighting devices that produce white light, but may be extended to solid state lighting devices that produce other colors of light.

Figure 4:
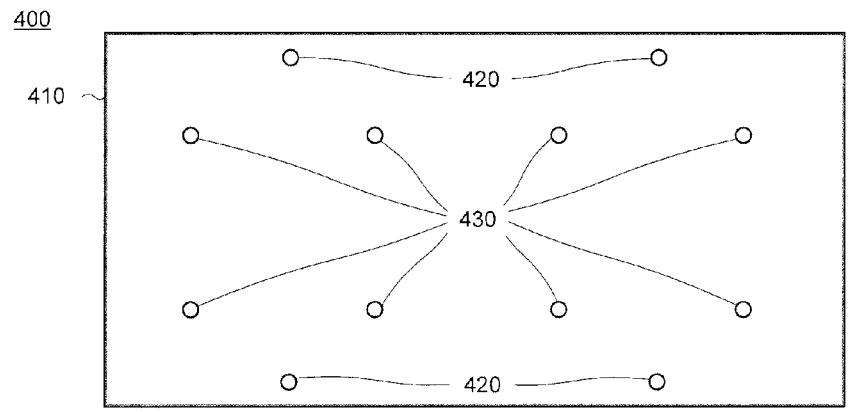
FIG. 4 illustrates an example of a universal mounting carriage.

By way of example, street lighting systems will be used to describe the properties and use of a "universal" mounting carriage for retrofitting street lighting systems with solid state light emitting devices 300 of the LED type, or equivalent. However, as those skilled in the art will readily appreciate, these aspects may be extended to other light sources without departing from the spirit and scope of the invention. FIG. 4 illustrates a mounting carriage 400 for supporting solid state light emitting devices 300. The mounting carriage 400 may be adapted to attach to any of a plurality of conventional street lights in place of non-solid state light sources. Each of the plurality of conventional street lights may differ from each other in at least one physical dimension.

The mounting carriage 400 may be mounted in a head of a street lamp. The carriage 400 may be attached to a street light head in place of a conventional non-solid state lighting system using at least one hole formed in the mounting carriage 400. The mounting carriage 400 comprises a plate 410. The plate 410 comprises a plurality of holes 420 that admit a properly sized threaded screw or bolt and which are arranged to affix the plate 410 to threaded holes in the housing head, or by an equivalent means of attachment. The plate 410 further comprises a plurality of threaded holes 430 configured to secure one or more solid state light emitting devices 300 by attaching the substrate 302 to the plate, as described below.

The plate 410 is adapted to support one or more solid state light emitting devices 300. The plate 410 may include attachment points, such as clips, threaded holes for screws or bolts, non-threaded holes for bolts, or the like, to attach the solid state light emitting devices 300 to the plate 410.

Figures 5A, 5B:
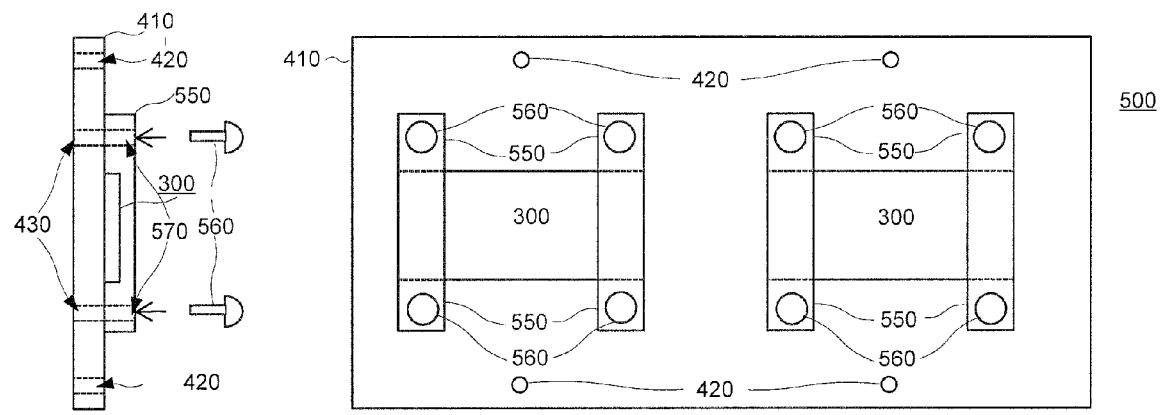
FIG. 5A illustrates a plan view of an example of a mounting carriage including one or more solid state light emitting devices attached.
FIG. 5B illustrates a side view of the mounting carriage and a solid state light emitting device of FIG. 5A.

FIG. 5 shows an example a carrier 400 adapted to attach solid state light emitting devices 300 to plate 410 using a flange (or bracket) 550 to hold the solid state light emitting devices 300 against the plate 410, although other equivalent means of attachment are equally valid. By way of example, threaded screws (or bolts) 560 pass through clearance holes 570 in the flange 550 to threaded holes 430 in the plate 410 to fasten the solid state light emitting devices 300 to the plate 410. Alternatively, holes 430 may be through holes 430 and a threaded nut may be used to fix screw 460 to couple the assembly of the solid state light emitting device 300 and flange 550 to the plate 410.

Figure 6:
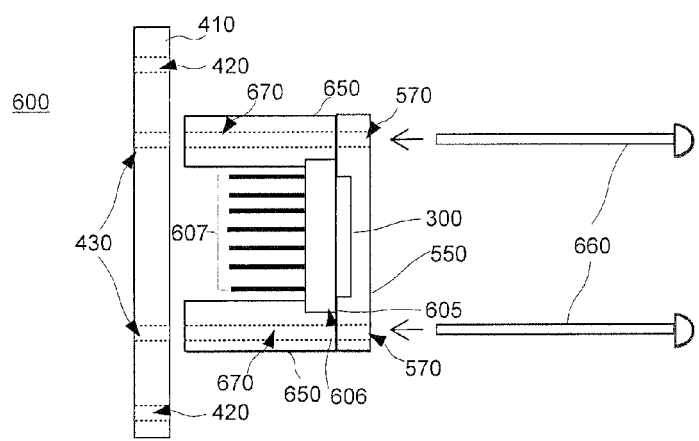
FIG. 6 illustrates an example of a flange and standoff arrangement for mounting a solid state light emitting device coupled to a heat sink.

In some implementations, the carrier 400 may be configured to accept a one or more solid state light emitting devices 300 that are mounted on heat sinks 605 as shown in FIG. 6. Heat sink 605 may comprise a thermal mass 606 and a plurality of heat radiating fins 607. The flanges 550 may be raised from the surface of the plate 410 and mounted on standoffs 650 to provide clearance for the heat sink 605. The standoffs 650 may have standoff through holes 670 of substantially the same inner diameter as that of flange holes 570 and holes 430 in the plate 410. A threaded screw (or bolt) 660 may pass through the flange hole 570, the standoff through hole 670 and the hole 430 in plate 410 to fasten the flange 550, standoffs 650, solid state emitting device 300 and heat sink 605 to the plate 410. By way of example, if the holes 430 are threaded, the screw 660 affixes all parts just listed to the plate 410. If the holes 430 are through holes, a plurality of nuts (not shown) threaded to mate to the screw 430 may be used to attach the same parts. Thus, the heat sink 605 for the corresponding solid state light emitting device 300 may be positioned between the plate 410 and the solid state light emitting device 300; that is, behind the solid state light emitting device 300.

Various styles of street light housing heads exist. For example, a Cobra head is one style of street lamp head. By example, a Cobra head includes a reflector, and a cover lens which encloses the light source in the housing.

The plate 410 may be installed in the street light head in place of the reflector, and inside the cover lens. Typically, the reflector is mounted to the lamp head via mounting connections, such as threaded holes and screws or bolts. The solid state light emitting devices 300 may be attached to the plate 410 before or after the plate 410 is mounted in the lamp head. However, in a retrofit procedure, it may be preferable to pre-install the solid state light emitting devices 300 prior to installing the plate 410.

The mounting carriage 400 may be adjustable in at least one dimension such that the one or more holes 430 in the plate 410 can be aligned with one or more reflector mounting points in any of the plurality of street light heads.

Figure 7A:
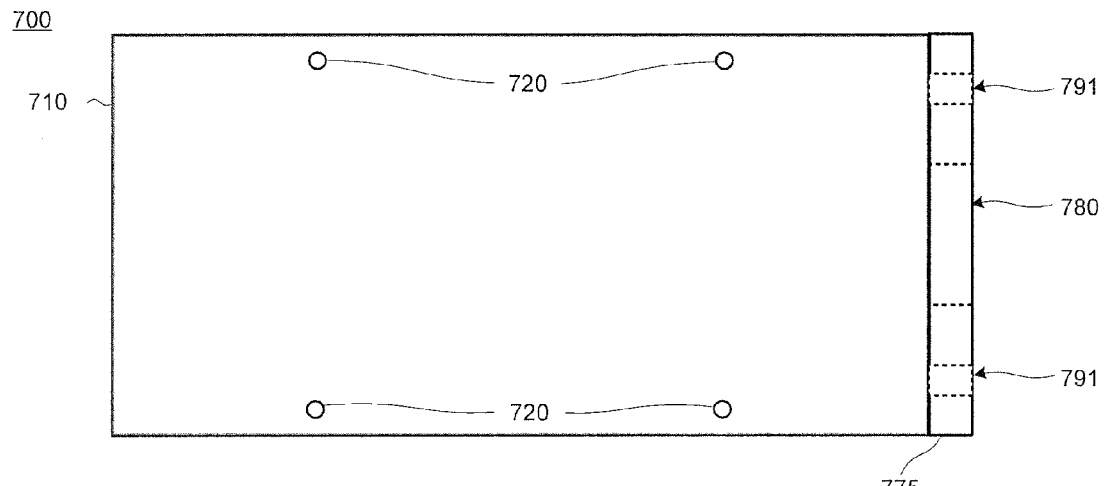
FIG. 7A illustrates a plan view of an example of a mounting carriage adapted to couple to a socket of a light housing.
Figure 7B:
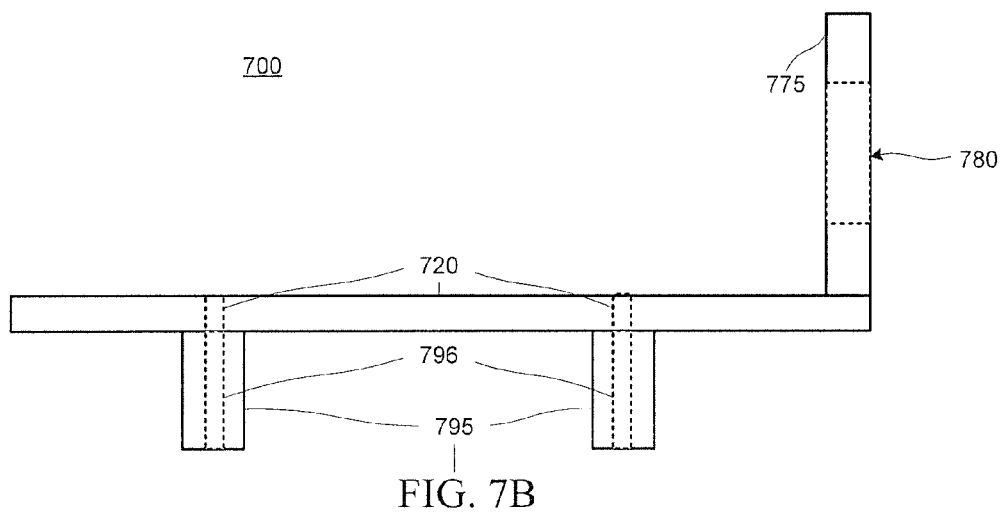
FIG. 7B illustrates a side view of the example of FIG. 7A.

In another example, as shown in FIGS. 7A and 7B, a mounting carriage 700 may have one or more holes adapted on a socket bracket 775 at a substantially right angle to a plate 710 to enable the mounting carriage 700 to be fastened in place of a non-solid state light emitting device socket (not shown) in any of the street lights. The socket bracket 775 may be an integral part of the mounting carriage 700, or it may be a separate part. FIGS. 7A and 7B merely show an exemplary arrangement of plate 710 and bracket 775. Plate 710 differs from plate 410 significantly only in that bracket 775 may be a part of the mounting carriage 700, as a unitary structure, may be attachable to the mounting carriage 700 using, for example, screws and threaded screw holes, or may be a detachable part of the mounting carriage 700. The bracket 775 includes at least one additional hole 780 for providing electrical power lines to the one or more solid state light emitting devices 300, and may include one or more mounting holes 791 to correspond to at least one or more holes (which may be threaded) used to mount the socket bracket 775 in place of the socket.

The mounting carriage 700 may include a plurality of standoffs 795 with through holes 796 that may be coupled to the mounting carriage 700 to enable the mounting carriage 700 to be mounted into any of the street lights at one or more reflector mounting holes. The mounting carriage 700 may include a second plurality of flanges or standoffs 650 that may be adjustably attached to the plate to enable the one or more solid state light emitting devices 300 to be attached to the mounting carriage 700.

Figure 7C:
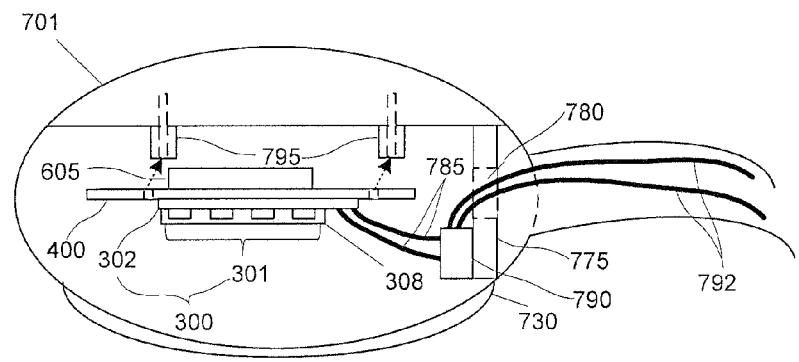
FIG. 7C illustrates an example of a street light head including a solid-state emitting device light source.

FIG. 7C illustrates an example of a street light head 701 including a solid-state emitting device light source. For example, as illustrated in FIG. 7C, the solid-state light emitting device light source may include a plurality of LEDs 301 overcoated phosphor material 308 on substrate 302.

An electrical ballast and transformer, which may be required for non-solid state light sources, may be replaced by a transformer and or power storing devices for electronics, such as solid state light emitting devices 300. The circuitry may be located on the substrate 302, on the mounting carriage 400, on the socket bracket 775, as shown in FIG. 7C, inside the pole of the street lamp, or any convenient location. As shown in the example in FIG. 7C, wires 785 couple the solid state light emitting devices 300 to the transformer or power storing entities. The circuitry 790 may couple the solid state light emitting devices 300 to power lines 792 provided to the light head through the street lamp pole via the hole 780 in the socket bracket 775. An optical element 730 may enclose the head 701 and provide various optical functions, such as beam dispersion, diffusion, etc., to determine the illumination pattern. Alternatively, the optical element 730 may be incorporated as a layer (not shown) over the solid state light emitting devices 300 to perform the same function.

In an aspect of the disclosure, the mounting carriage 700 may be coupled to the optical element 730, provided the optical element 730 includes one or more holes (not shown) to mate one or more standoffs 795 having the through holes 796 to the optical element 730 with threaded screws or bolts using one or more of a plurality of holes 720, instead of coupling the mounting carriage to the street light head or reflector. Alternatively, the optical element may be removed and the mounting carriage 700 installed in place of the optical element 730, using a same set of holes or fixturing used to attach the optical element 730 to the street light head with screws to attach the standoffs.

Figure 8:
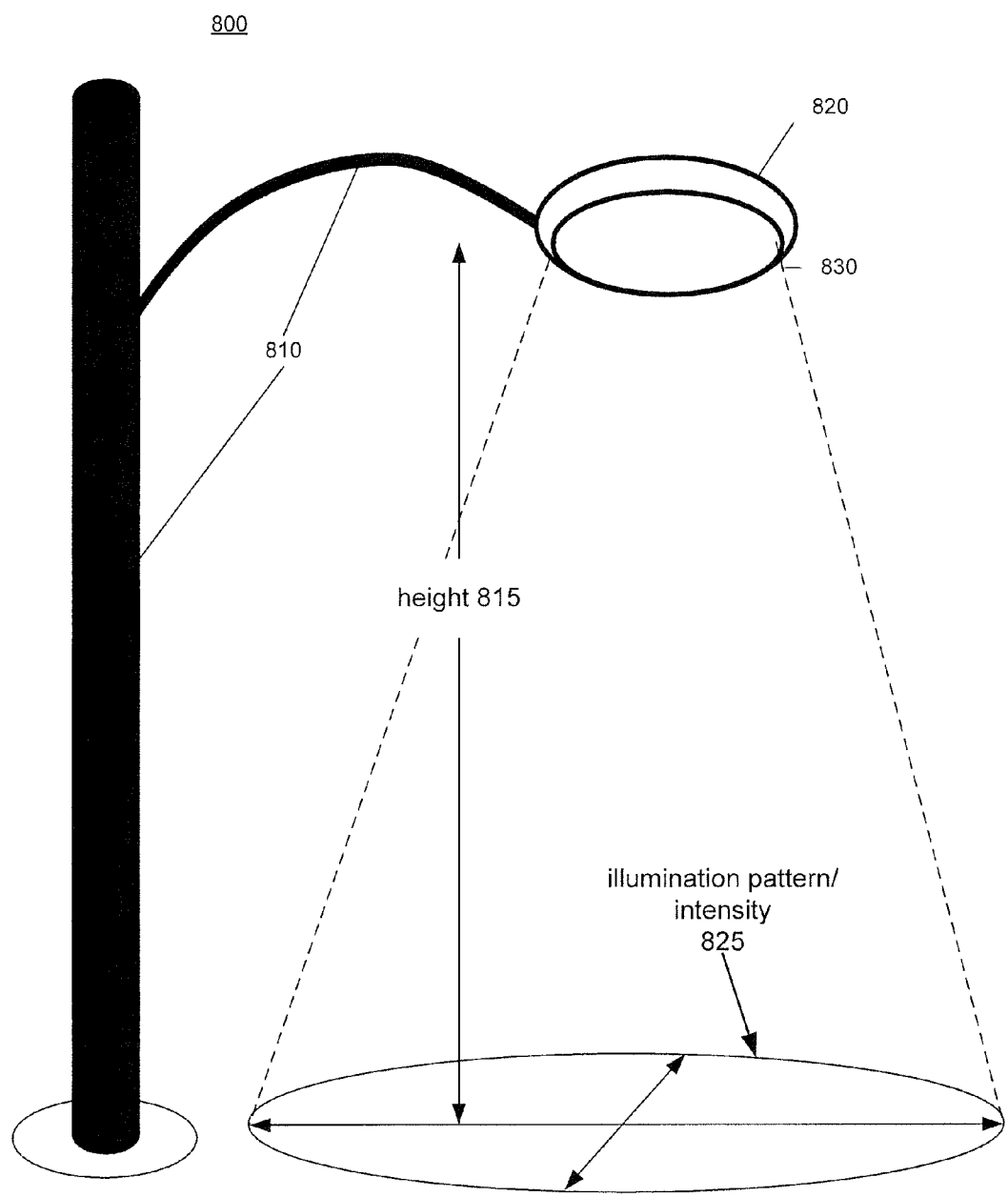
FIG. 8 is a street light.

FIG. 8 is an example of an application of solid state light emitting devices 300 to a street lamp 800. The street lamp 800 includes a lamp pole 810 and the overhanging arm, 815, and a head 820 attached to the pole 810. The head 820 includes a light source comprising a plurality of solid state light emitting devices 300 (not shown in FIG. 8) and an optical element 830 configured to produce a light distribution pattern from the light emitted from the solid state light emitting devices.

An example of the components included in the head 820 is described with reference to FIG. 7C, above, and will not be related in detail here.

The solid state light emitting devices 300 may have structures substantially like lateral effect LEDs. That is, each of the solid state light emitting devices may include a first surface that can be attached to the substrate 302 and a second surface opposite the first surface, where one or more electrodes may be attached to the second surface. In vertical effect LEDs, the first surface of the solid state emitting device 302 may include one electrode attached to a conductive portion of the substrate, and a second electrode, on the second surface of the solid state emitting device, may provide for an electrode connection. Thus, details of wires attached to the solid state light emitting devices 300, the driver circuitry 790, and the like, may differ in detail, but have the same functional role of providing an appropriate excitation to the solid state light emitting devices 300.

In the case of the lateral effect solid state light emitting device 300, the one or more electrodes on the second surface are coupled to each other electrically. For example, in the case of a semiconductor LED, one electrode may be coupled to an n-type region of semiconductor material, and a second electrode may be coupled to a p-type region of semiconductor material. The n-type region interfaces with the p-type region, forming a junction. In this manner the first and second electrodes are coupled to each other.

The light source may further include a heat sink (e.g., 605, as shown, for example, in FIGS. 6, 7C) thermally coupled to the solid state light emitting devices 300. For example, the substrate 302 upon which the solid state light sources can be mounted may, in turn, be mounted on a heat sink 605. That is, the substrate 302 has a first and a second side, where the solid state emitting devices are mounted on the first side of the substrate, and the second side of the substrate 302 is attached to the heat sink 605. Alternatively, each solid state light emitting device may be mounted on a heat sink 605, and the heat sink mounted on the first side of the substrate.

The substrate 302 and heat sink may be coupled to the head 820 in a variety of ways. By referring to FIG. 6, one may see how the various combinations described herein may be achieved. A mounting carriage 400 may support the solid state light emitting devices 300, where the mounting carriage 400 is attached to the head 820. In one example, where the first side of the substrate 302 supports both the solid state light emitting devices and the heat sinks 605, and where the heat sinks 605 are attached and thermally coupled to the first side of the substrate 302, the substrate 302 may be directly attached to the carriage 400. In an alternative example, the solid state light emitting devices 302 may be directly attached to the first side of the thermally conductive substrate 302, the heat sink 605 may be directly attached to the second side of the substrate 302, and the substrate 302 may be attached to the mounting carriage 400 using standoffs, or equivalents, to provide space for the heat sinks 605 and air circulation for removal of waste heat. In another example, the solid state light emitting devices 300 may be directly coupled to the first side of the substrate 302, the second side of the substrate 302 may be directly coupled to a first side of the carriage 400, and the heat sink 605 may be directly mounted to a second side of the carriage 400, where the substrate 302 is thermally conductive. The carriage 400 may be coupled to the head 820 directly, such as with screws adapted to fit screw holes where, for example, a reflector plate may have formerly been attached, or via standoffs 795, to permit space for the heat sinks 805 between the mounting carriage 400 and the screw holes.

The optical element 830 may comprise a single dome opposite the solid state light emitting devices 300 arranged to produce a light distribution pattern 825, as may be needed for any particular street illumination requirement. The dome may include any of a plurality of sub-elements mounted separately to direct and/or diffuse the light from the solid state emitting devices. Alternatively, the solid state light emitting devices may have the optical element 830 comprised of a single molded optical structure or a plurality of sub-structures molded to the surface of the solid state light emitting devices 300.

A street light having a conventional first light source may be retrofitted by removing the first light source from the head 820 and installing a second light source comprising a plurality of solid state light emitting devices 300. The solid state light emitting devices 300 may be mounted on a substrate 302, as described above, and with or without a heat sink, as described above. The substrate 302 may be supported by the mounting carriage, as described above. The mounting carriage 400 may further include a driver electrically coupled to the solid state light emitting devices 300 to provide power to excite the solid state light emitting devices 300. The second light source may be electrically coupled to a power source, for example, through electrical lines in the pole 810, which are introduced into the head 820, and which were previously attached to the socket. The electrical lines may couple to the solid state light emitting devices 300 via the driver.

Removing the first light source may include removing a non-solid state light source and a reflector from the head 820. The reflector is attached to the head 820 by an attachment means, which may be, for example, a one or more screws and threaded screw holes in the head 820, or an equivalent means. The reflector may be removed, for example, by removing the one or more screws extending through the reflector into the one or more screw holes in the head 820 and attaching the second light source. Removal of the first light source may also include removal of an electrical socket for the non-solid state light emitting device from the head 820.

The second light source may be installed by inserting one or more screws through the mounting carriage 400 into the one or more screw holes in the head 820. A plate may be attached where the electrical socket was previously installed, where the plate has a hole to feed the one or more electrical lines from the pole 810 to couple to the solid state light emitting devices 300. The electrical lines may couple to the solid state light emitting devices 300, for example, via the driver. The plate may also provide mechanical support for the solid state module.

Among the characteristics that are taken into account to select an array size of solid state light emitting devices 300 and the focusing, dispersion and/or diffusion properties of the optical element 830, are included the height 815 of the lamp post 810, and the illumination pattern/intensity 825 sought for the application.

The claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A street light comprising:
   a pole;
   a head attached to the pole, the head comprising:
      a plurality of solid state light emitting devices;
      an optical element configured to produce a light distribution pattern from light emitted from the plurality of solid state light emitting devices; and
      a mounting carriage configured to support the plurality solid state light emitting devices, wherein the optical element is coupled to the head via the mounting carriage and wherein the mounting carriage comprises a first set of holes for mounting the one or more solid state light emitting devices to the mounting carriage and a second set of one or more holes for mounting the mounting carriage to a top inner surface of the head, and wherein the mounting carriage further comprises a mounting plate and a socket bracket perpendicular to the mounting plate to install the mounting carriage in the head.

2. The street light of claim 1, further comprising a substrate, wherein the plurality of solid state light emitting devices are arranged on the substrate and attached to the mounting carriage via the substrate.

3. The street light of claim 2, wherein the substrate is thermally conductive for dissipating heat.

4. The street light of claim 2, further comprising a heat sink attached to the substrate.

5. The street light of claim 1, wherein a phosphor encapsulates the plurality of solid state light emitting devices.

6. The street light of claim 1, wherein a phosphor layer encapsulates each solid state light emitting device of the plurality of solid state light emitting devices separately.

7. The street light of claim 1, wherein the head comprises a heat spreader thermally coupling the mounting carriage to the head.

8. The street light of claim 1, wherein the head is designed with at least one mounting connection configured for a non-solid state light source, and wherein the mounting carriage is installed in the head via the at least one mounting connection.

9. The street light of claim 1, wherein the plurality of solid state light emitting devices are attached to the mounting carriage by one of a flange or threaded screws.

10. The street light of claim 1, wherein the socket bracket comprises at least one hole for providing electrical power lines to the plurality of solid state light emitting devices.

11. The street light of claim 1, further comprising a set of standoffs attached to the mounting plate for attaching the mounting carriage to the head, wherein the standoffs are adjustable based on mounting connections in the head.

12. The street light of claim 1, further comprising circuitry attached to the mounting carriage, the circuitry coupling the plurality of solid state light emitting devices to power lines provided to the head, wherein the circuitry replaces an electrical ballast associated with the non-solid state light source and configures the solid state light emitting devices to be powered by an AC power source.

13. The street light head of claim 12, wherein the socket bracket comprises a hole, and wherein the power lines are provided from the pole to the circuitry in the head via the hole, and wherein the circuitry is configured to electrically couple the solid state light emitting devices to the power lines.

14. The street light of claim 1, wherein the solid state light emitting devices are configured to be powered directly from an alternating current (AC) power source.

15. A street light comprising:
   a pole;
   a head attached to the pole, the head comprising:
      a plurality of solid state light emitting devices;
      an optical element configured to produce a light distribution pattern from light emitted from the plurality of solid state light emitting devices; and
      a mounting carriage configured to support the plurality solid state light emitting devices, wherein the optical element is coupled to the head via the mounting carriage and wherein the mounting carriage comprises a first set of holes for mounting the one or more solid state light emitting devices to the mounting carriage and a second set of one or more holes for mounting the mounting carriage to a top inner surface of the head, and wherein the optical element is coupled to the mounting carriage via the second set of the one or more holes.

16. The street light of claim 15, wherein the head is designed with at least one mounting connection configured for a non-solid state light source, and wherein the mounting carriage is installed in the head via the at least one mounting connection.

17. The street light of claim 15, wherein the mounting carriage further comprises a mounting plate and a socket bracket perpendicular to the mounting plate to install the mounting carriage in the head.

18. The street light of claim 17, further comprising a set of standoffs attached to the mounting plate for attaching the mounting carriage to the head, wherein the standoffs are adjustable based on mounting connections in the head.

19. The street light of claim 17, further comprising circuitry attached to the mounting carriage, the circuitry coupling the plurality of solid state light emitting devices to power lines provided to the head, wherein the circuitry replaces an electrical ballast associated with the non-solid state light source and configures the solid state light emitting devices to be powered by an AC power source.

20. The street light of claim 1, wherein the optical element is coupled to the mounting carriage via the second set of the one or more holes.

* * * * *